United States Patent [19]
Irvin

[11] Patent Number: 6,021,317
[45] Date of Patent: Feb. 1, 2000

[54] DUAL ANTENNA RADIOTELEPHONE SYSTEMS INCLUDING AN ANTENNA-MANAGEMENT MATRIX SWITCH AND ASSOCIATED METHODS OF OPERATION

[75] Inventor: David Irvin, Raleigh, N.C.

[73] Assignee: Ericsson Inc., Research Triangle Park, N.C.

[21] Appl. No.: 08/846,277

[22] Filed: Apr. 30, 1997

[51] Int. Cl.$^7$ .................................................. H04B 1/44
[52] U.S. Cl. ............................................. 455/78; 455/101
[58] Field of Search .............................. 455/78, 101, 90, 455/132, 133, 134, 135, 140, 226.1, 226.2, 272, 277.1, 277.2, 575, 129; 333/101

[56] References Cited

U.S. PATENT DOCUMENTS

| | | | |
|---|---|---|---|
| 5,353,334 | 10/1994 | O'Sullivan | 333/101 |
| 5,463,406 | 10/1995 | Vannatta et al. | 343/725 |
| 5,613,219 | 3/1997 | Vogel et al. | 455/78 |
| 5,724,666 | 3/1998 | Dent | 455/101 |
| 5,809,405 | 9/1998 | Yamaura | 455/101 |

FOREIGN PATENT DOCUMENTS

| | | |
|---|---|---|
| 195 33 247 | 3/1996 | Germany . |
| 2 293 277 | 3/1996 | United Kingdom . |

OTHER PUBLICATIONS

U.S. Patent application, Serial No. 08/586,433 filed Jan. 16, 1996.

*Primary Examiner*—Reinhard J. Eisenzopf
*Assistant Examiner*—Greta J. Fuller
*Attorney, Agent, or Firm*—Myers Bigel Sibley & Sajovec

[57] ABSTRACT

Dual antenna radiotelephones which include antenna-management switching means that allow the radiotelephones to assume a plurality of different static and dynamic configurations, either adaptively or in response to user commands. These switching means may also provide a means for connecting the radiotelephone to one or more external antennas, and may facilitate use of diversity reception and or transmission techniques. In one embodiment of the present invention, the radiotelephone includes a transmitter, first and second receivers, a user interface, first and second antennas, and antenna switching means. These antenna switching means selectively couple the transmitter, the first receiver and the second receiver to the first and second antennas. The antenna switching means may be implemented as a matrix switch that selectively electrically connects (i) the transmitter to the first antenna, (ii) the transmitter to the second antenna, (iii) the first receiver to the first antenna and (iv) the second receiver to the second antenna.

23 Claims, 6 Drawing Sheets

DUAL ANTENNA RADIOTELEPHONE SYSTEMS INCLUDING AN ANTENNA-MANAGEMENT MATRIX SWITCH AND ASSOCIATED METHODS OF OPERATION

FIELD OF THE INVENTION

The present invention relates generally to radiotelephones, and, more particularly, to dual antenna radiotelephones.

BACKGROUND OF THE INVENTION

Radiotelephones, which are well known in the art, generally refer to communications terminals which can provide a wireless communications link to one or more other communications terminals. Such radiotelephones are used in a variety of different applications, such as cellular telephone systems and commercial and military satellite communications applications. As radiotelephone communications technology has matured and the uses for such terminals proliferated, significant advancements have been achieved in reducing the size, weight and cost of radiotelephones while improving their performance. However, while these advancements have provided a variety of relatively compact radiotelephones, significant demand still exists for both smaller and lighter radiotelephones and for radiotelephones which provide enhanced signal quality or additional capabilities. Tempering these demands are cost considerations, as the availability of other forms of communication limit the amount many potential consumers are willing to pay for the additional convenience of smaller handsets or improved communications quality.

The size and weight of a radiotelephone are typically increasing functions of the radio frequency transmit power which the radiotelephone is designed to provide. This required transmit power is determined by the link budgets associated with the communications systems in which the radiotelephone is designed to operate. These link budgets typically provide link margins to account for a variety of fixed or varying losses, which may include propagation losses and the losses associated with both the transmit and receive antenna systems. Accordingly, to the extent that these propagation and antenna system losses can be minimized, the required transmit power typically is reduced thereby reducing the size and weight of a given radiotelephone.

One such propagation loss occurs when a mismatch exists between the polarization of the received signal and the polarization of the receive antenna. As most radiotelephones employ linearly polarized (i.e., horizontal or vertical) dipole antennas, the opportunity for mismatch between the polarization of the signal received at the antenna and the polarization of the receive antenna is quite high, as the antenna on the handheld radiotelephone is typically not stationary, and hence may often be held at an orientation different than the orientation of the antenna on the radio which transmitted the signal. Such polarization mismatch may also occur (or be further aggravated) as a result of obstructions on the line-of-sight path between the transmitting and receive terminals, which can alter the polarization orientation of the signal during propagation. While the extent of the loss in receive signal power which occurs as a result of polarization mismatch varies significantly depending on orientation, in the worst case it can be quite severe.

Another potential propagation loss which may be accounted for in the system link budgets (and transmit power requirements) is the loss to signal power which may occur during propagation due to atmospheric conditions, such as rain or snow, or due to other physical obstacles which reflect radio frequency energy. These "reflection" losses are path dependent (i.e., the losses are a function of the actual path the signal traverses during transmission), as they are based on the conditions encountered by the waveform in propagating from the transmit antenna to the receive antenna.

The extent to which a receive signal is degraded as a result of polarization or reflection losses tends to vary depending upon a number of factors, including the geography, the type of antenna on the terminal communicating with the radiotelephone (e.g., fixed orientation or variable orientation) and the atmospheric conditions. Accordingly, depending upon a users location and the type of radiotelephones used, a user may or may not be concerned with polarization and/or reflection losses.

A third type of loss which impacts the transmit power a radiotelephone is required to provide is the signal loss incurred in the antenna feed structure on both the transmit and receive terminals. On most conventional radiotelephones, this feed structure includes an antenna duplexer which functions to channel energy received from the antenna to the receiver during periods of reception and to couple signals from the transmitter to the antenna during periods of transmission. Such duplexers typically incur a loss in signal power on the order of 2–3 dB.

Each of the above-mentioned losses in signal power must be accounted for in establishing the link budgets for the communications system in which the radiotelephone is to operate. This is done by designing the system so that sufficient signal power will be received even when one or more of these losses occur, thereby ensuring that an acceptable communications link may be established in the majority of situations. To provide this additional power margin in the link budgets, system designers typically require increased transmit power on each transmitting terminal or attempt to provide increased transmit or receive antenna gain through the use of a directional antenna. However, providing such increased transmit power or upgraded antennas may negatively impact the size, weight and cost of the radiotelephones used in the communications system.

Various researchers have recognized that by providing a second antenna on a radiotelephone, it may be possible to reduce certain losses in receive signal power. However, these researchers have failed to identify a system for managing such a second antenna in a way that permits tapping its full capabilities without the unproductive duplication of circuitry.

In addition to consumer demand for smaller and lighter radiotelephones, there is also a significant demand for radiotelephones with additional capabilities. In response to this demand, the industry is in the process of transitioning from an environment where almost all radiotelephone communications were provided via mature and relatively inexpensive analog technology to digital service which is capable of providing additional features and improved performance. These digital systems make more efficient use of the bandwidth available for various types of radiotelephone communications, provide additional features such as communications security and often take advantage of error correction coding, interleaving and other techniques to provide enhanced signal clarity as compared to their analog counterparts. However, while use of digital radiotelephones is becoming increasingly prevalent, the transition from analog to digital service may take years or even decades to occur. Consequently, mobile radiotelephone users, such as cellular telephone users, may find that they require a digital radiotelephone in some geographic locations and an analog radiotelephone in others. This situation has resulted in a great demand in the marketplace for dual-mode (analog and digital) radiotelephones, which allow users to purchase a single radiotelephone that is capable of operating in both analog service and digital service regions. However, such dual-mode radiotelephones are typically larger, heavier and more expensive than comparable single-mode radiotelephones due to duplication of circuitry.

In light of the above-mentioned problems with current radiotelephones, a need exists for radiotelephones that are designed to minimize the effects of propagation, reflection and antenna feed losses, thereby allowing the use of smaller and lighter transmit power and power storage (battery) systems in the radiotelephone. A need also exists for dual-mode (analog/digital) radiotelephones which can be configured to provide a high degree of performance in a variety of different communications environments without requiring duplicative circuitry which might increase the size, weight or cost of the radiotelephone.

SUMMARY OF THE INVENTION

In view of the above limitations associated with existing radiotelephones, it is an object of the present invention to provide dual antenna radiotelephones and associated methods of operation which minimize the effects of propagation, reflection and antenna feed losses.

Another object of the present invention is to provide dual antenna radiotelephones and associated methods of operation which more fully exploit the potential benefits provided by inclusion of a second antenna, including the ability to efficiently provide for both analog or digital communications and to reduce signal power losses, without the unnecessary duplication of circuitry.

It is still a further object of the present invention to provide dual antenna radiotelephones and associated methods of operation which can be dynamically reconfigured so as to optimize performance in various communications environments.

Additional objects, features and advantages of the present invention will become apparent upon reading the following detailed description and appended claims and upon reference to the accompanying drawings.

These and other objects of the present invention are provided by dual antenna radiotelephones which include antenna-management switching means that allow the radiotelephones to assume a plurality of different static and dynamic configurations, either dynamically, or in response to user commands. These switching means may also provide a means for connecting the radiotelephone to one or more external antennas, and may facilitate use of diversity reception and or transmission techniques.

In one embodiment of the present invention, the radiotelephone includes a transmitter, first and second receivers, a user interface, first and second antennas, and antenna switching means. These antenna switching means selectively couple the transmitter, the first receiver and the second receiver to the first and second antennas. The antenna switching means may be implemented as a matrix switch that selectively electrically connects (i) the transmitter to the first antenna, (ii) the transmitter to the second antenna, (iii) the first receiver to the first antenna and (iv) the second receiver to the second antenna.

Radiotelephones according to the present invention may have a first antenna which has a first polarization and a second antenna which has a second polarization that is substantially orthogonal to the polarization of the first antenna. These antennas may be spatially isolated to provide for spatial diversity. The radiotelephone may also include means for selecting between electromagnetic signals received at the first and second receivers. In another embodiment, the transmitter may be capable of transmitting both analog and digital signals and the first receiver may similarly be capable of receiving both analog and digital signals, and the radiotelephone further includes analog/digital control means for switching the configuration of the transmitter and the first receiver between analog and digital reception.

In still another embodiment of the present invention, the matrix switch may assume a plurality of different configurations. In a first such configuration, the matrix switch electrically connects the first antenna to the first receiver and the second antenna to the transmitter, while electrically isolating the first antenna from the transmitter and the second antenna from the second receiver. In a second configuration, the matrix switch electrically connects the first antenna to the transmitter and the first receiver, while electrically isolating the second antenna from the transmitter and the second receiver. In a third configuration, the matrix switch electrically connects the first antenna to the first receiver and the second antenna to the second receiver during periods of reception, and electrically connects the first antenna to the transmitter and electrically isolates the second antenna from the transmitter during periods of transmission. In a fourth configuration, the matrix switch electrically connects the first antenna to the first receiver and the second antenna to the second receiver during periods of reception, and electrically connects the second antenna to the transmitter and electrically isolates the first antenna from the transmitter during periods of transmission. Finally, in a fifth configuration, the matrix switch electrically connects the first antenna to the first receiver and the second antenna to the second receiver during periods of reception, and electrically connects the transmitter to whichever of the first and second antennas received the signal during the previous period of reception and electrically isolates the other antenna from the transmitter during periods of transmission.

In an alternative embodiment of the invention, the radiotelephone may further comprise a connector for electrically coupling the radiotelephone to an external device. In this embodiment, the matrix switch may selectively electrically connect the transmitter and the first receiver to this connector. In an alternative embodiment, the radiotelephone instead further includes an external antenna, an external duplexer, a first connector and a second connector. In this embodiment, the first and second connectors are electrically coupled to the external antenna via the external duplexer, and the matrix switch selectively electrically connects the external antenna through the duplexer to the transmitter and the first receiver. The radiotelephone may also include a second connector for electrically coupling the radiotelephone to a second external device. In this embodiment, the matrix switch may further selectively electrically connect the transmitter and the second receiver to this second connector.

The radiotelephone may also include control means for configuring the antenna switching means. In one embodiment, these control means are responsive to commands input via the user interface. In another embodiment, the control means are responsive to commands included in one or more of the electromagnetic signals received by the first or second receivers. In yet another embodiment, the control means adaptively configure the antenna switching means in response to sensing means which are included with the radiotelephone. These control means may also be used to configure the matrix switch to isolate the transmitter from the first and second antennas during periods of reception and to isolate the first and second receivers from the first and second antennas during periods of transmission.

In still another aspect of the present invention, methods of configuring a radiotelephone having a transmitter, a first receiver, a second receiver, and an antenna management matrix switch are provided. Pursuant to these methods, configuration control instructions are received, and in response to these instructions a selection is made between a first configuration where the matrix switch electrically connects the first antenna to the first receiver and the second antenna to the transmitter while electrically isolating the first antenna from the transmitter and the second antenna from the second receiver and a second configuration where the matrix switch electrically connects the first antenna to the transmitter and the first receiver while electrically isolating the second antenna from the transmitter and the second receiver. The antenna-management matrix switch is then set to implement the selected configuration.

Through the inclusion of the antenna-management switching means discussed above, the dual antenna radiotelephones according to the present invention provide an innovative way of managing the antenna resources so as to more fully exploit the potential benefits provided by the dual antennas. Such benefits include the ability to efficiently provide for both analog or digital communications and use of configurations that reduce various signal power losses, including certain propagation, reflection and antenna feed losses, without the unnecessary duplication of circuitry. Accordingly, pursuant to the teachings of the present invention it will be possible to further reduce the transmit power requirements, and hence the size and weight, of radiotelephones. Moreover, these radiotelephones may be either statically or dynamically reconfigured so as to optimize performance in various communications environments.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Additionally, it will be understood by those of skill in the art that the present invention may be advantageously used in a variety of applications, and thus the present invention should not be construed as limited in any way to the examples described herein. Like numbers refer to like elements throughout.

Figure 1:
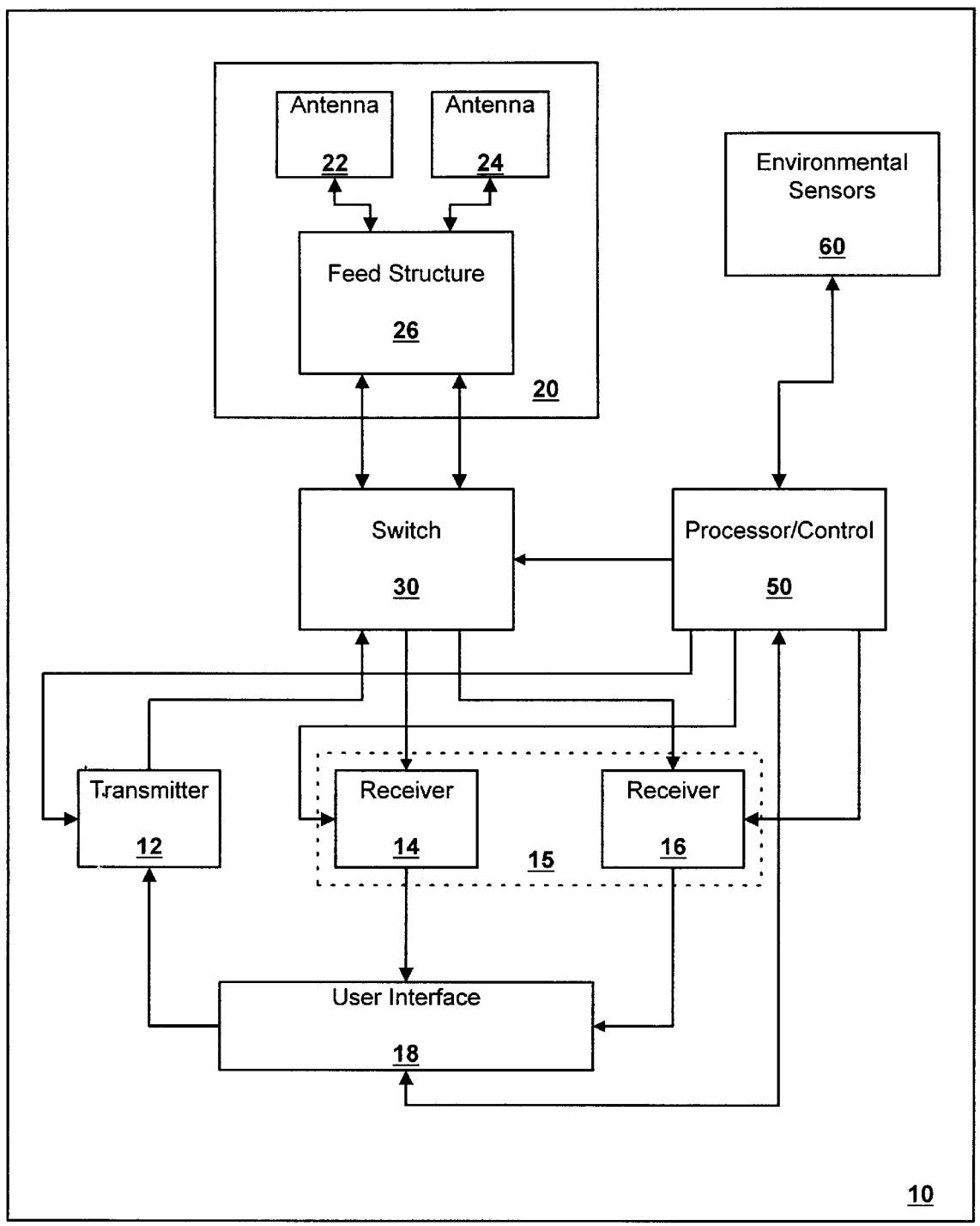
FIG. 1 is a block diagram of a dual antenna radiotelephone which includes an antenna-management matrix switch according to the present invention.

An embodiment of a radiotelephone 10 according to the present invention is illustrated in FIG. 1. Radiotelephone 10 generally comprises a transmitter 12, receivers 14, 16, a user interface 18, an antenna system 20, an antenna-management switch 30 and processing and control circuitry 50. Radiotelephone 10 may comprise any type of two-way wireless radio voice communications terminal, such as, for example, a satellite communications terminal, a cellular telephone system base station, or a citizens-band radio transceiver. In a preferred embodiment of the present invention, radiotelephone 10 comprises a hand-held cellular telephone with a flip 82 mouthpiece, such as the telephone illustrated in FIG. 2.

A user of radiotelephone 10 provides information which is to be transmitted via user interface 18. User interface 18 may comprise a keypad, a telephone handset, a microphone, a display or a combination thereof, or may be any other interface known to those of skill in the art. The information to be transmitted is coupled to transmitter 12, which transforms the information into an electromagnetic signal suitable for radio communications. As will be understood by those of skill in the art, transmitters 12 may be provided that represent and transmit the information provided by a user in either an analog or a digital format.

As illustrated in FIG. 1, the antenna system 20 of radiotelephone 10 includes at least two antennas 22, 24 and an antenna feed network 26. The antennas 22, 24 are coupled to the transmitter 12 and receivers 14, 16 via antenna feed network 26 and antenna-management switch 30. Antennas 22, 24 may comprise any conventional radiotelephone antenna, such as a monopole antenna, a dipole antenna, a helix antenna, a microstrip antenna or a patch antenna.

Figure 2:
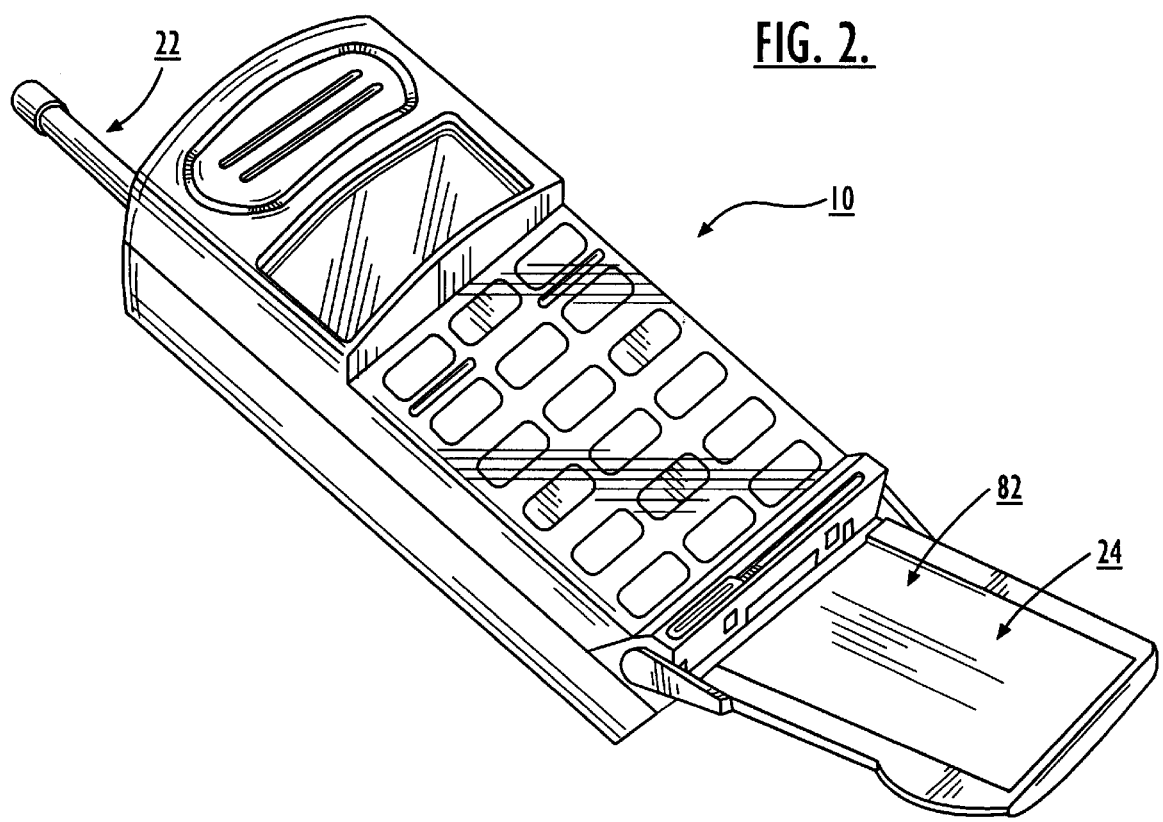
FIG. 2 is a front perspective view of a cellular telephone.

As illustrated in FIG. 2, in one embodiment of the present invention, radiotelephone 10 is a cellular telephone which includes a hinged mouthpiece or "flip" 82. The radiotelephone 10 includes two antennas, a monopole antenna 22 mounted in a conventional manner to extend from the top of the radiotelephone and a patch antenna 24 that is integrated into the flip 82 of the radiotelephone. This embodiment of the present invention advantageously maximizes the spatial separation between antennas 22, 24, thereby increasing the isolation between the antennas 22, 24 and facilitating any diversity reception capabilities provided by the radiotelephone. This arrangement also takes advantage of the fact that a flip 82 mounted antenna 24 may provide better performance than a conventionally mounted antenna when the flip 82 is extended.

In an alternative embodiment, antennas 22, 24 are both conventionally mounted, linearly polarized antennas, each of which is polarized differently with respect to the other, so as to permit the use of polarization diversity. Thus in this embodiment the polarization of antennas 22, 24 should vary by at least 20 degrees, and more preferably vary by 45 degrees, and even more preferably vary by 80 degrees or more. Those of skill in the art will understand that antennas with polarizations other than linear polarizations may also be used, and that with such other antennas it is preferable to achieve similar polarization isolation to the isolation described in the preferred embodiments discussed above.

Antennas 22, 24 may also be mounted colinearly, with one above the other on a common axis. Additionally, those of skill in the art will recognize that radiotelephones with various other antenna configurations may advantageously utilize the teachings of the present invention, and that the examples described herein are only provided to illustrate preferred embodiments of the present invention and should not be construed as limiting the scope of the invention, which is set forth in the claims appended hereto.

Also illustrated in FIG. 1 are receivers 14, 16 which are coupled to antenna system 20 via antenna-management switch 30. Receivers 14, 16 are used to demodulate electromagnetic signals transmitted to radiotelephone 10 so as to provide the information contained in the signals to user interface 18 in a format which is understandable to the user. Two separate receivers 14, 16 are provided to allow the radiotelephone 10 to optionally operate with diversity reception. As will be understood by those of skill in the art, receivers 14, 16 may comprise two separate receivers or a single diversity receiver 15 having two receiver chains (represented by the dashed box in FIG. 1) which includes two input ports.

Diversity reception refers to the practice of providing two or more antennas that are connected to separate receivers (or to a diversity receiver). In diversity systems, the antennas are typically positioned in relative orientation to each other (e.g., sufficiently spaced apart or placed so as to provide substantially different orientations) such that when a signal received at one of the antennas includes a high degree of interference or is weak, the signal received at the other antenna will typically be stronger or include a lesser degree of interference. Such a difference between the two received signals is possible because the spatially displaced antennas each receive the signal via a different path. In addition, as discussed above, the antennas may also be cross-polarized, so that if the orientation of the received signal has a poor polarization match with one of the antennas, it should have a better match with the other. Whichever type of diversity system is used, the system selects between the received signals and typically provides the information contained in the higher quality signal to the user.

When radiotelephone 10 operates in a diversity reception configuration, receiver 14 receives a signal from one of antennas 22, 24 and receiver 16 receives a signal from the other of antennas 22, 24. Selecting means are then used to choose between the signals received by receivers 14, 16. These selecting means are typically implemented as digital circuitry which may be part of receivers 14, 16, part of a diversity receiver 15, or implemented as a stand alone circuit in processor/control system 50. The selecting means then compares certain characteristics of the received signals, such as the estimated signal-to-noise ratio, and selects the received signal which is estimated to have experienced less fading, interference or loss due to mismatched polarization orientation as the received signal which is provided to the user.

Preferably, the antennas configured in diversity are spaced-apart from one another by more than one quarter the wavelength associated with the carrier frequencies of the signals transmitted to the receiver. Such an antenna configuration works fairly well to overcome various potential propagation losses, including certain multipath fading effects. However, it will be understood by those of skill in the art that at lower operating frequencies, it may not be possible to configure two antennas on various handheld radiotelephones which are spatially separated by more than one quarter wavelength. In many such situations, polarization diversity may provide a greater improvement than spatial diversity.

As illustrated in FIG. 1, radiotelephone 10 also includes an antenna-management switch 30, which interconnects transmitter 12 and receivers 14, 16 with antenna system 20. In the embodiment of FIG. 1, switch 30 selectively couples transmitter 12 and receivers 14, 16 with antennas 22, 24 to provide for the transmission and reception of communications signals by the radiotelephone 10.

Figure 3:
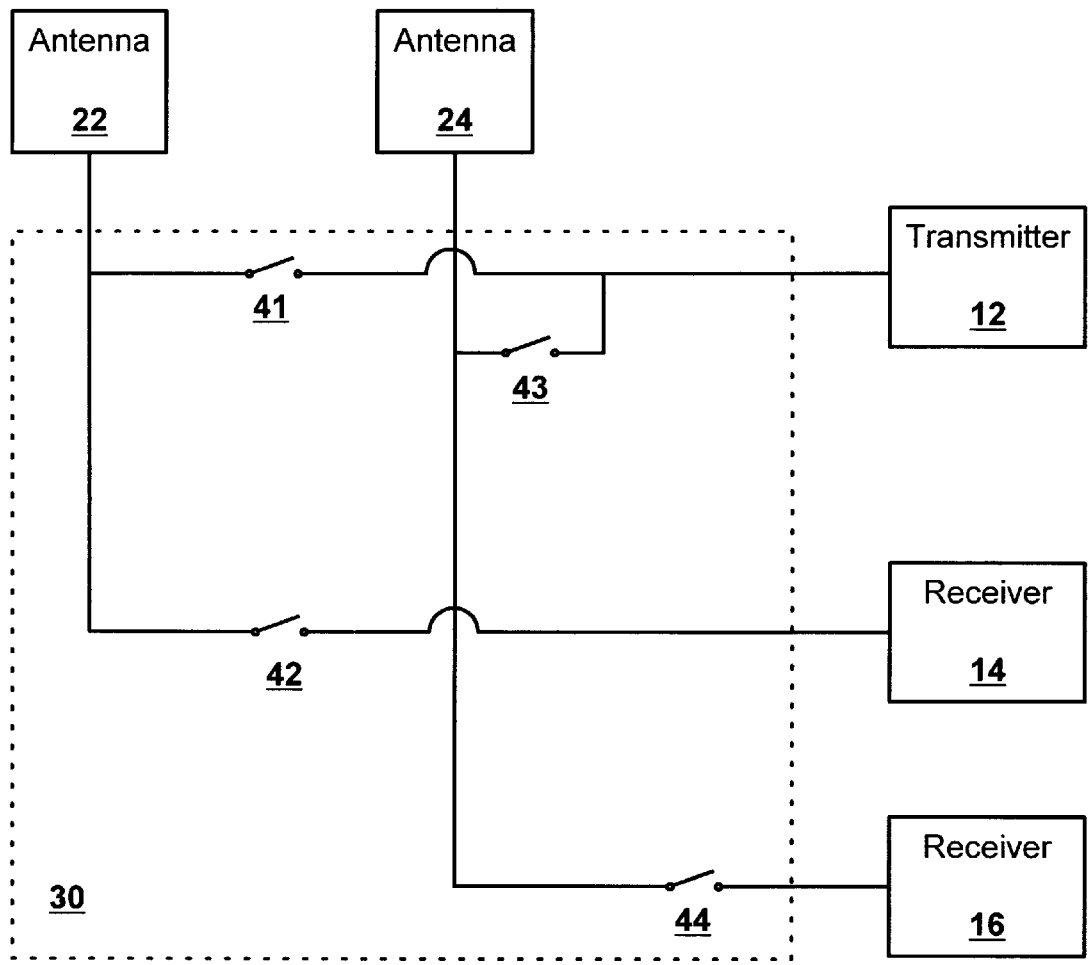
FIG. 3 is a circuit diagram of a preferred embodiment of the antenna-management matrix switch according to the present invention.

Antenna-management switch 30 may comprise any of a variety of conventional switching mechanism for interconnecting several inputs with several outputs. As illustrated in FIG. 3, in one embodiment, antenna-management switch 30 comprises a sparse matrix switch. In the embodiment of FIG. 3, switch 30 comprises individual switches 41, 42, 43, 44, where switch 41 is provided along the electrical connection between antenna 22 and transmitter 12, switch 42 is provided along the electrical connection between antenna 22 and receiver 14, switch 43 is provided along the electrical connection between antenna 24 and transmitter 12, and switch 44 is provided along the electrical connection between antenna 24 and receiver 16. Switches 41, 42, 43, 44 may comprise any electrical, mechanical or elctromechanical switching mechanisms known to those of skill in the art. Preferably electrical switches comprised of PIN diodes or gallium arsenide field effect transistors are used.

Antenna switching means 30 may assume a plurality of different static and dynamic configurations. The configuration selected may be controlled by control means provided in radiotelephone 10, which may be implemented as part of processor/control means 50.

By way of example, in the embodiment of switch 30 illustrated in FIG. 3, radiotelephone 10 may assume a variety of different configurations by opening and closing different combinations of switches 41, 42, 43, 44. For instance, by open circuiting switches 41, 44 and close circuiting switches 42, 43, radiotelephone 10 may be configured (Configuration 1-A) to receive signals (via receiver 14) on antenna 22 and transmit signals on antenna 24. In an alternative configuration (Configuration 1-B), switches 42, 43 may be open circuited and switches 41, 44 close circuited, so that signals are received (via receiver 16) on antenna 24 and transmitted on antenna 22. In each of these configurations one antenna is used for transmission of signals and the other antenna is used to receive signals.

By using one antenna for transmission and a second antenna for reception, both these configurations make it possible to eliminate the need for an antenna duplexer. Such a duplexer is required if radiotelephone 10 only includes a single antenna, as a means for coupling the antenna to both the transmitter and receiver. Elimination of the duplexer is advantageous in light of both the cost and physical space required by this additional component. Additionally, the use of a second antenna eliminates the radio frequency power loss associated with use of an antenna duplexer, which typically is on the order of 3 dB. Elimination of this power loss allows identical reductions in the radio frequency power and power storage (battery) requirements of radiotelephone 10, which may correspond to additional savings in weight, size and cost.

As will be understood by those of skill in the art, the radiotelephones and methods of the present invention are particularly suited for dual-mode (analog/digital) communications applications. Radiotelephones 10 designed to operate in such systems are typically capable of transmitting and receiving both analog and digital signals. Such radiotelephones typically include analog/digital control means which allow the user to select between analog and digital operation, which may be implemented as a user activated switch or toggle that sets (possibly via processor/control circuitry 50) the transmitter 12 and receivers 14, 16 to operate in the appropriate mode. However, while the present invention possesses numerous advantages for dual-mode operation, the invention is not limited to such dual-mode radiotelephones, as it may be advantageously utilized in both single mode analog or digital radiotelephone applications.

When radiotelephone 10 comprises a digital telephone or a dual-mode telephone operating in a digital mode, a dynamic switching capability is preferably included, such that the "closed" switches do not remain statically closed during the course of a communication, but instead dynamically alternate between the closed and open states in synchronization with the transmit and receive portions of the digital frame structure. In this manner, it is possible to increase the isolation between transmitter 12 and receivers 14, 16, thereby maximizing the power level of the communications signal which is transmitted or received. Thus for example, in Configuration 1-A, switch 42 is closed during periods of reception and opened during periods of transmission, reception, while switch 43 is closed during periods of transmission and opened during periods of reception. Similarly, in Configuration 1-B, switch 44 is closed during periods of reception and opened during periods of transmission, while switch 41 is closed during periods of transmission and opened during periods of reception.

By opening switches 43, 44 and closing switches 41, 42, the switch 30 illustrated in FIG. 3 may operate in a third configuration (Configuration 2-A). In this configuration, communications signals are both transmitted and received via antenna 22, as is typical for most analog and digital radiotelephone communications. As a single antenna is used for both transmission and reception in this configuration, switches 41, 42 should dynamically open and close in synchronization with the respective transmission and reception portions of the digital frame structure to ensure that the received signal is isolated from transmitter 12 and the signal to be transmitted is isolated from receiver 14. In a similar configuration, switches 41, 42 are opened and switches 43, 44 closed to provide for communications via antenna 24 (Configuration 2-B).

The embodiment of switch 30 illustrated in FIG. 3 also allows for the radiotelephone to operate with diversity reception. For instance by opening switch 43 and closing switches 41, 42, 44 (Configuration 3), radiotelephone 10 may be configured to transmit signals using antenna 22 and to receive signals on both antenna 22 (via receiver 14) and antenna 24 (via receiver 16). Similarly, by opening switch 41 and closing switches 42, 43, 44 (Configuration 4), radiotelephone 10 may be configured to transmit signals using antenna 24 and to receive signals on both antenna 22 (via receiver 14) and antenna 24 (via receiver 16).

As with Configurations 1-A, 1-B, 2-A and 2-B above, when operating in a digital mode in Configurations 3 and 4, the "closed" switches are typically not statically closed, but instead dynamically alternate between the closed and open states in synchronization with the transmit and receive portions of the digital frame structure. Hence, in Configuration 3, switch 41, is closed during periods of transmission and opened during periods of reception, while switches 42, 44 are closed during periods of reception and opened during periods of transmission. Similarly, in Configuration 4, switch 43, is closed during periods of transmission and opened during periods of reception, while switches 42, 44 are closed during periods of reception and opened during periods of transmission. Such dynamic switching prevents unwanted coupling of the transmit signal into one or both of the diversity receivers or unwanted coupling of a received signal into the transmitter. Typically, diversity reception is only used when operating in a digital mode.

However, while in the embodiment of the present invention illustrated in FIG. 3, switches 41, 42, 44 (in Configuration 3) and switches 42, 43, 44 (in Configuration 4) would all dynamically open and close, it will be understood by those of skill in the art that switch 44 (in Configuration 3) and switch 42 (in Configuration 4) may remain statically closed, as no direct transmission path exists between receiver 16 and antenna 22 (in Configuration 3) and between receiver 14 and antenna 24 (in Configuration 4). However, by dynamically operating switch 44 (in Configuration 3) and switch 42 (in Configuration 4), it will be understood that additional isolation may be achieved, and hence in an alternative embodiment all three switches are dynamically opened and closed in both Configuration 3 and Configuration 4.

The embodiment of switch 30 illustrated in FIG. 3 may also be used to facilitate diversity transmission techniques. Diversity transmission refers to the technique of using the information obtained from diversity receivers 14, 16 during a preceding frame to select which antenna to use for transmitting a signal in one or more subsequent frames. In a typical embodiment, a decision regarding which antenna to use is made on every frame, and the antenna selected is the antenna which received the signal with the higher bit energy to noise ratio during the reception portion of the preceding frame.

To provide for diversity transmission (Configuration 5), switch 30 may be configured so that switches 42, 44 are closed during periods of reception and one of switches 41 and 43 is closed during periods of transmission, where switch 41 is closed if receiver 14 received the signal with the higher bit energy to noise ratio during the preceding frame, and switch 43 is closed if receiver 16 received the signal with the higher bit energy to noise ratio during the preceding frame. Table 1 summarizes the configuration of switches 41, 42, 43, 44 corresponding to each configuration described above (where "1" indicates the switch is closed, "0" indicates the switch is open, and "1'" indicates the switch is closed if the corresponding antenna is selected for diversity transmission during that frame). As will be understood by those of skill in the art, while Table 1 indicates static configurations, each of these configurations may also be implemented so as to include a dynamic switching capability where the "closed" switches alternate between the closed and open states in synchronization with the transmit and receive portions of the digital frame structure. In addition, those of skill in the art will also recognize that additional configurations are possible and that the present invention is not limited to the illustrative configurations or embodiments discussed herein.

TABLE 1

| Configuration | 41 | 42 | 43 | 44 |
| --- | --- | --- | --- | --- |
| 1-A | 0 | 1 | 1 | 0 |
| 1-B | 1 | 0 | 0 | 1 |
| 2-A | 1 | 1 | 0 | 0 |
| 2-B | 0 | 0 | 1 | 1 |
| 3 | 1 | 1 | 0 | 1 |
| 4 | 0 | 1 | 1 | 1 |
| 5 | 1' | 1 | 1' | 1 |

In several alternative embodiments, the radiotelephone 10 of the present invention may also be configured to provide for communications through an external antenna. This external antenna may connect to the radiotelephone via a docking station or similar accessory. Use of such an external antenna may be particularly advantageous with handheld cellular telephones, as a fixed external antenna (e.g., a vehicle mounted antenna) may provide enhanced performance via a closer polarization match, an improvement in the line-of-sight path between the communicating terminals, and/or by increasing the directivity of the antenna used with the cellular radiotelephone.

Figure 4:
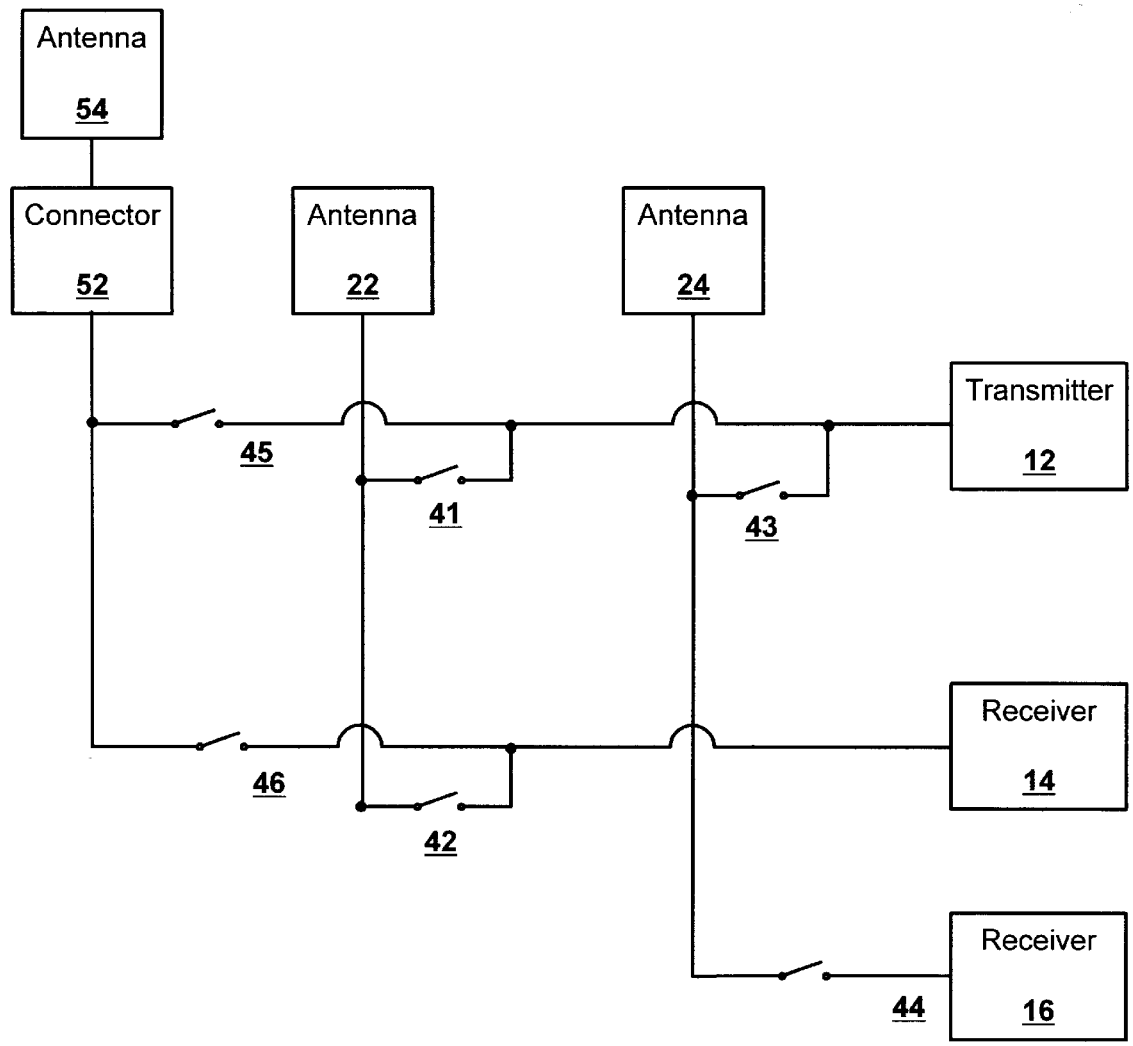
FIG. 4 is an alternative embodiment of the antenna-management matrix switch according to the present invention which accommodates an external antenna.

FIG. 4 illustrates one such alternative embodiment. As illustrated in FIG. 4, in this embodiment two additional switches are provided: switch 45 which couples connector 52 to transmitter 12, and switch 46 which couples connector 52 to receiver 14. As is also seen in FIG. 4, external antenna 54 is coupled to connector 52, which may be part of a docking station. This embodiment allows implementation of any of the above-described configurations where antenna 22 is instead replaced by external antenna 54. As the external antenna typically provides superior performance over either the antennas 22, 24 integral to radiotelephone 10, the embodiment of FIG. 4 will most likely be configured to provide for both transmission and reception through the external antenna 54 (Configuration 7-A in Table 2 below). However, as will be understood by those of skill in the art, numerous different configurations may be implemented using the embodiment of FIG. 4, including the illustrative configurations (Configurations 6–10) listed in Table 2, which correspond to Configurations 1–5 illustrated in Table 1, except that they provide for communications through external antenna 54 instead of antenna 22.

TABLE 2

| Configuration | 41 | 42 | 43 | 44 | 45 | 46 |
| --- | --- | --- | --- | --- | --- | --- |
| 6-A | 0 | 0 | 1 | 0 | 0 | 1 |
| 6-B | 0 | 0 | 0 | 1 | 1 | 0 |
| 7-A | 0 | 0 | 0 | 0 | 1 | 1 |
| 7-B | 0 | 0 | 1 | 1 | 0 | 0 |
| 8 | 0 | 0 | 0 | 1 | 1 | 1 |
| 9 | 0 | 0 | 1 | 1 | 0 | 1 |
| 10 | 0 | 0 | 1' | 1 | 1' | 1 |

Figure 5:
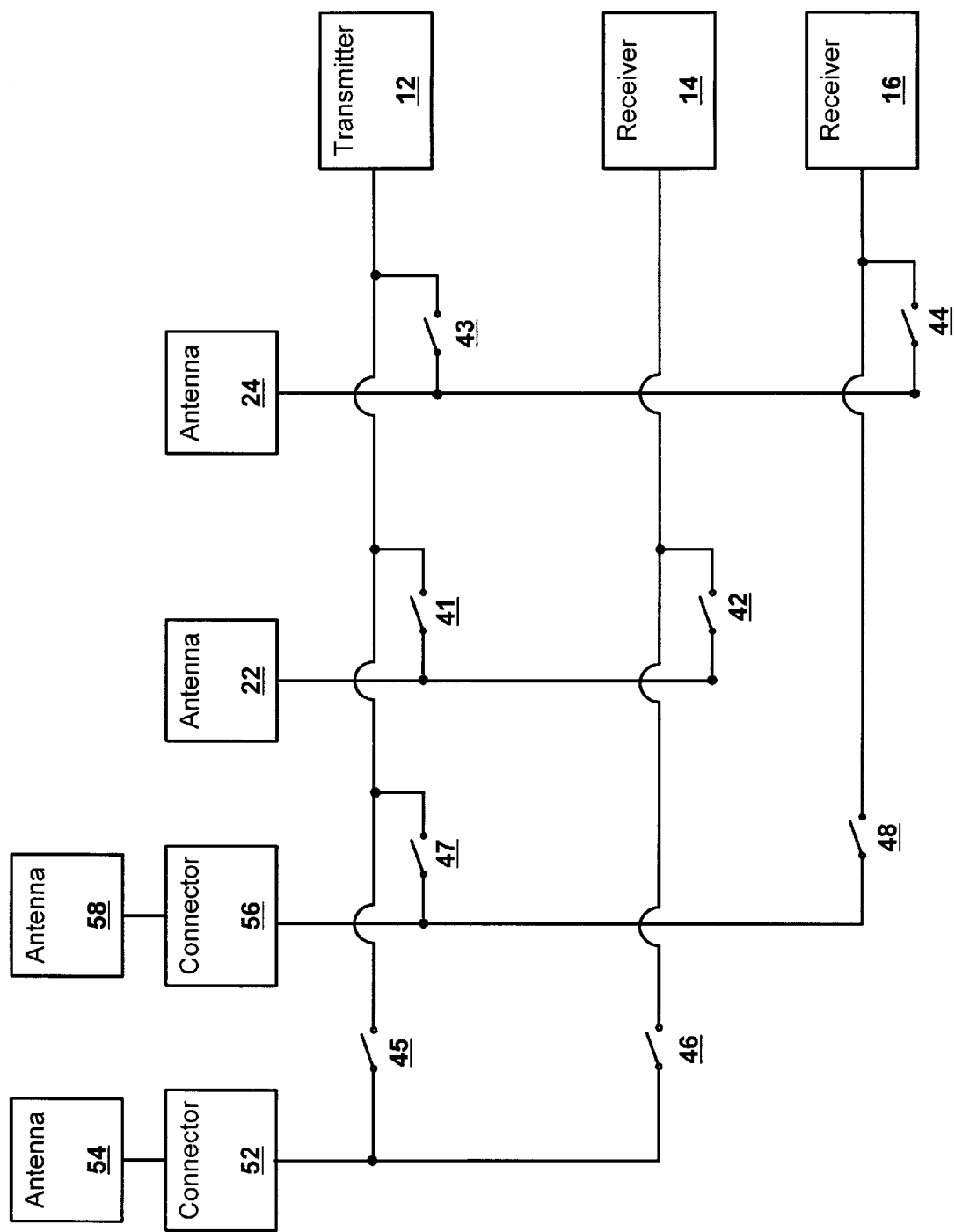
FIG. 5 is an alternative embodiment of the antenna-management matrix switch according to the present invention which accommodates two external antennas.

FIG. 5 illustrates an expanded embodiment of the embodiment of FIG. 4. In this embodiment an additional connector 56 and a second external antenna 58 are provided, which are coupled to transmitter 12 via switch 47 and to receiver 16 via switch 48. Once again, as external antennas 54, 58 typically provide superior performance as compared to antennas 22, 24, the embodiment of FIG. 5 will most likely be configured to provide for both transmission and reception through external antennas 54, 58. This is accomplished by opening switches 41, 42, 43, 44 and setting switches 45, 46, 47, 48 to provide communications in a manner similar to Configurations 1–5 discussed above, except that antennas 22, 24 are replaced by external antennas 54, 58. Several of the additional antenna configurations (Configurations 11–15) which may be implemented if antenna management switch 30 is implemented as illustrated in FIG. 5 are summarized in Table 3.

TABLE 3

| Configuration | 41 | 42 | 43 | 44 | 45 | 46 | 47 | 48 |
| --- | --- | --- | --- | --- | --- | --- | --- | --- |
| 11-A | 0 | 0 | 0 | 0 | 0 | 1 | 1 | 0 |
| 11-B | 0 | 0 | 0 | 0 | 1 | 0 | 0 | 1 |
| 12-A | 0 | 0 | 0 | 0 | 1 | 1 | 0 | 0 |
| 12-B | 0 | 0 | 0 | 0 | 0 | 0 | 1 | 1 |
| 13 | 0 | 0 | 0 | 0 | 1 | 1 | 0 | 1 |
| 14 | 0 | 0 | 0 | 0 | 0 | 1 | 1 | 1 |
| 15 | 0 | 0 | 0 | 0 | 1' | 1 | 1' | 1 |

Figure 6:
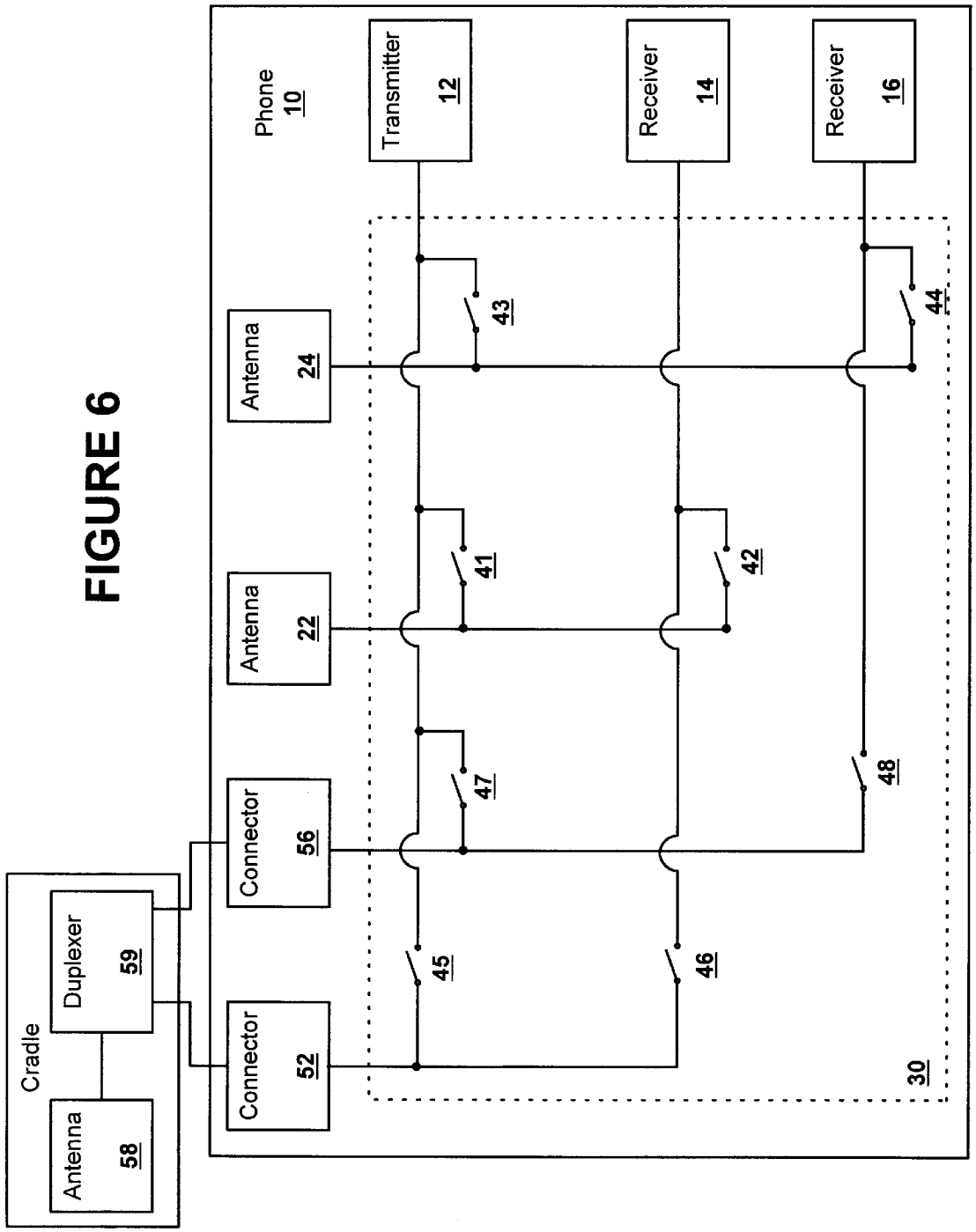
FIG. 6 is an alternative embodiment of the antenna management matrix switch according to the present invention which provides for analog service via an external antenna and duplexer.

In another embodiment of the present invention, switch 30 may be configured to provide for analog communications with a radiotelephone lacking a duplexer. As shown in FIG. 6, this may be accomplished by the same switching matrix illustrated in FIG. 5, which interconnects antennas 22, 24 external duplexer 59 and external antenna 58 to transmitter 12 and receiver 14 via connectors 52, 56. In this configuration, switches 45, 48 are statically closed, and all other switches are statically open. As will be understood by those of skill in the art, a variety of other configurations may also be used.

The configuration of the switch 30 on radiotelephone 10 may be controlled by one or more different methods. In one embodiment of the present invention, switch 30 may be configured adaptively by radiotelephone 10. In this embodiment, radiotelephone 10 includes sensors 60 that would detect changes in the communications environment and automatically adapt the configuration of switch 30 in response to these changes. These sensing means might include sensors that gauge the power level of the received signal, the position or orientation of the antennas, or other parameters that impact the quality of the communications signals transmitted and received by radiotelephone 10. By way of example, if radiotelephone 10 comprises a cellular telephone with a patch antenna located in a flip mouthpiece, sensing means 60 might be designed to recognize the position of the flip and configure the radiotelephone to transmit and receive communications on the flip antenna if the flip is extended, while transmitting and receiving signals on the conventional antenna when the flip is closed. Similarly, the sensing means 60 might also or alternatively monitor the orientation of the antennas 22, 24 on the radiotelephone 10, and set switch 30 to transmit and receive signals through the antenna with a polarization orientation most closely matched to the orientation of the antenna on the terminal with which radiotelephone 10 is communicating.

Switch 30 may also be configured via commands by a user. Such commands might be received from either the user of radiotelephone 10 or a remote communications terminal such as a cellular base station. Commands from the user of the radiotelephone may be input via user interface 18, and implemented by a control signal from processing and control circuitry 50. Commands from a remote terminal, on the other hand, would be received as part of the control information included in a received signal, and this control information would be acted upon by processing and control circuitry 50 to implement a change in the configuration of switch 30.

Finally, switch 30 may also be configured at the time of manufacture or the time of service activation, where it is locked into a fixed setting. This in effect serves to hardwire the radiotelephone to a specific configuration. Such an option may be preferable in manufacturing situations where various models of the same radiotelephone are produced, as the same switch may be included in every radiotelephone although only some radiotelephones might include other components such as a second antenna, a diversity receiver, or an antenna duplexer.

In the respective embodiment illustrated in FIG. 3, in response to a command, be it internally generated by radiotelephone 10 or provided from an external source such as the user or a remote communications terminal, the processor/control electronics 50 on radiotelephone 10 configures switch 30 to electrically connect the transmitter 12 to one of the antennas 22, 24 at least during periods of transmission, and to electrically connect receiver 14 to one of antennas 22, 24 at least during periods of reception, while electrically isolating transmitter 12 and receiver 14 from the antennas to which they are not respectively connected. The processor/control electronics 50 further configures switch 30 to electrically isolate receiver 16 during periods of reception from the one of antennas 22, 24 that is electrically connected to receiver 14 during periods of reception. Additionally, if diversity reception is to be employed (e.g., Configurations 3–5), the processor also configures switch 30 to electrically connect receiver 16 to the one of antennas 22, 24 that is isolated from receiver 14.

In the drawings, specification and examples, there have been disclosed typical preferred embodiments of the invention and, although specific terms are employed, these terms are used in a generic and descriptive sense only and not for purposes of limitation, the scope of the invention being set forth in the following claims. Accordingly, those of skill in the art will themselves be able to conceive of embodiments of the dual antenna radiotelephone and associated methods other than those explicitly described herein without going beyond the scope of the present invention.

That which is claimed is:

1. A radiotelephone for transmitting and receiving electromagnetic signals, comprising:
    a transmitter;
    a first receiver;
    a second receiver;
    a user interface for coupling information between the user and said transmitter and said receiver;
    first and second antennas;
    a matrix switch which selectively couples said transmitter, said first receiver and said second receiver to said first and second antennas; and
    control means associated with said matrix switch for configuring said radiotelephone in a plurality of configurations, said configurations comprising:
        a first configuration wherein said first antenna is electrically coupled to said first receiver and electrically isolated from said transmitter and wherein said second antenna is electrically coupled to said transmitter and electrically isolated from said second receiver; and
        a second configuration wherein during periods of reception said first antenna is electrically coupled to said first receiver and said second antenna is electrically coupled to said second receiver and wherein during periods of transmission said transmitter is electrically coupled to one of said first and second antennas and electrically isolated from the other of said first and second antennas.

2. The radiotelephone of claim 1, wherein said first antenna has a first polarization and said second antenna has a second polarization substantially different from the polarization of said first antenna.

3. The radiotelephone of claim 2, wherein said second antenna has a polarization orthogonal to the polarization of said first antenna.

4. The radiotelephone of claim 1, further comprising selecting means for selecting between electromagnetic signals received at said first and second receivers.

5. The radiotelephone of claim 4, wherein the plurality of configurations further comprises a fourth configuration wherein during periods of reception said first antenna is electrically coupled to said first receiver and said second antenna is electrically coupled to said second receiver and during periods of transmission said transmitter is electrically coupled to whichever of said first and second antennas received the signal selected by said selecting means during the previous period of reception and electrically isolated from the other antenna.

6. The radiotelephone of claim 1, wherein said plurality of configurations further comprises:
    a third configuration wherein said first antenna is electrically coupled to said transmitter and said first receiver and said second antenna is electrically isolated from said transmitter and said second receiver.

7. The radiotelephone of claim 1, wherein said control means further comprises means for configuring said radiotelephone to isolate:
    said transmitter from said first and second antennas during periods of reception; and
    said first and second receivers from said first and second antennas during periods of transmission.

8. The radiotelephone of claim 1, further comprising a connector for electrically coupling said radiotelephone to an external device, and wherein said matrix switch further selectively electrically connects said transmitter and said first receiver to said connector.

9. The radiotelephone of claim 8, further comprising a second connector for electrically coupling said radiotelephone to a second external device, and wherein said matrix switch further selectively electrically connects said transmitter and said second receiver to said second connector.

10. The radiotelephone of claim 1, further comprising an external antenna, an external duplexer, a first connector and a second connector, wherein:
    said first and second connectors are electrically coupled to said external antenna via said external duplexer; and
    said matrix switch further selectively electrically connects said external antenna to said transmitter and said first receiver.

11. The radiotelephone of claim 1, wherein said transmitter is capable of transmitting both analog and digital signals and wherein said first receiver is capable of receiving both analog and digital signals, said radiotelephone further comprising analog/digital control means for switching the configuration of said transmitter and said first receiver between analog and digital reception.

12. The radiotelephone of claim 1, wherein said matrix switch comprises:
    a first electrical switch along the electrical connection between said first antenna and said transmitter;
    a second electrical switch along the electrical connection between said first antenna and said first receiver; and
    a third electrical switch along the electrical connection between said second antenna and said transmitter.

13. The radiotelephone of claim 12, wherein said matrix switch further comprises a fourth electrical switch along the electrical connection between said second antenna and said second receiver.

14. The radiotelephone of claim 1, wherein said control means are responsive to commands input via said user interface.

15. The radiotelephone of claim 1, wherein said control means are responsive to commands included in one or more of the electromagnetic signals received by said first or second receivers.

16. The radiotelephone of claim 1, further comprising sensing means, and wherein said control means adaptively configure said matrix switch in response to said sensing means.

17. The radiotelephone of claim 1, further comprising means for selectively electrically connecting said transmitter to whichever of said first and second antennas received the signal selected by said selecting means during the previous period of reception while electrically isolating the other antenna from said transmitter.

18. A method of configuring a radiotelephone having a transmitter, a first receiver, a second receiver, a first antenna, a second antenna and an antenna management matrix switch, comprising the steps of:

receiving configuration control instructions;

in response to the configuration control instructions, selecting between:
  a first configuration wherein the first antenna is electrically coupled to the first receiver and electrically isolated from the transmitter and the second antenna is electrically coupled to the transmitter and electrically isolated from the second receiver; and
  a second configuration wherein the first antenna is electrically coupled to the transmitter and the first receiver and the second antenna is electrically isolated from the transmitter and the first receiver; and setting the matrix switch to implement the selected configuration.

19. The method of claim 18, wherein said receiving step comprises receiving control instructions from the user interface.

20. The method of claim 18, wherein said receiving step comprises receiving control instructions from one or more of the electromagnetic signals received by the radiotelephone.

21. The method of claim 18, wherein the radiotelephone further comprises a processor and sensing means and wherein said receiving step comprises receiving control instructions from the processor in response to the sensing means.

22. The method of claim 18, wherein said selecting step further comprises selecting between:

a third configuration wherein during periods of reception the first antenna is electrically coupled to the first receiver and the second antenna is electrically coupled to the second receiver and during periods of transmission the first antenna is electrically coupled to the transmitter and the second antenna is electrically isolated from the transmitter; and a fourth configuration wherein during periods of reception the first antenna is electrically coupled to the first receiver and the second antenna is electrically coupled to the second receiver and during periods of transmission the second antenna is electrically coupled to the transmitter and the first antenna is electrically isolated from the transmitter.

23. The method of claim 22, wherein said selecting step further comprises selecting between a fifth configuration wherein during periods of reception the first antenna is electrically coupled to the first receiver and the second antenna is electrically coupled to the second receiver and during periods of transmission the transmitter is electrically coupled to one of the first and second antennas and electrically isolated from the other of said first and second antennas.

* * * * *